United States Patent [19]
Takiguchi et al.

[11] Patent Number: 5,668,357
[45] Date of Patent: Sep. 16, 1997

[54] SEAT COMBINATION SWITCH

[75] Inventors: Syuji Takiguchi; Hiroshi Ichikawa; Keizo Nishitani, all of Shizuoka, Japan

[73] Assignee: Yazaki Corporation, Tokyo, Japan

[21] Appl. No.: 655,189

[22] Filed: May 30, 1996

[30] Foreign Application Priority Data

Jun. 7, 1995 [JP] Japan .................... 7-140846

[51] Int. Cl.$^6$ .................... H01H 9/26
[52] U.S. Cl. .................... 200/5 R; 200/302.1
[58] Field of Search .................... 200/5 R, 5 A, 200/43.18, 302.1

[56] References Cited

U.S. PATENT DOCUMENTS

| | | | |
|---|---|---|---|
| 2,363,854 | 11/1944 | Bierenfeld | 200/5 R |
| 4,473,724 | 9/1984 | Suzuki | 200/5 R |
| 5,086,313 | 2/1992 | Misawa | 200/5 R |
| 5,128,500 | 7/1992 | Hirschfeld | 200/5 R |
| 5,260,532 | 11/1993 | Tinder et al. | 200/302.1 |
| 5,384,440 | 1/1995 | Wnuk et al. | 200/5 R |
| 5,442,149 | 8/1995 | Sato | 200/5 R |
| 5,584,380 | 12/1996 | Naitou | 200/315 |

FOREIGN PATENT DOCUMENTS

| | | | |
|---|---|---|---|
| 310443 | 1/1991 | Japan | H01H 21/24 |
| 320823 | 2/1991 | Japan | H01H 9/02 |
| 410940 | 1/1992 | Japan | H01H 25/06 |
| 4112123 | 9/1992 | Japan | B60N 2/06 |

*Primary Examiner*—Stuart N. Hecker
*Attorney, Agent, or Firm*—Sughrue, Mion, Zinn, Macpeak & Seas

[57] ABSTRACT

A thin plate-like switch unit comprises a board having a plurality of contacts, and a sheet-like rubber contact member superposed on the board, the rubber contact member having convex switch portions for opening and closing the plurality of contacts, respectively. A side cover covers the switch unit fixedly mounted on a side surface of a seat portion. Windows are formed through the side cover, and the switch portions are exposed through these windows. Flanges are formed at peripheral edge portions of the windows, and projects outwardly beyond the switch portions. Preferably, the switch portions are arranged in corresponding relation to directions of movement of the seat.

6 Claims, 11 Drawing Sheets

SEAT COMBINATION SWITCH

BACKGROUND OF THE INVENTION

This invention relates to a seat combination switch having a plurality of switch portions for operating a power seat.

One example of seats mounted on a vehicle is a so-called power seat whose position can be automatically adjusted by an electric motor. Generally, a switch for operating this electric motor is mounted on a side surface of a seat cushion portion (seat portion). Japanese Utility Model Unexamined Publication No. Hei. 3-20823 discloses one example of such seat switch having a pair of switch operating portions (key tops) mounted on an upper surface thereof, and this seat switch will be described with reference to FIGS. 18 and 19.

FIG. 18 is a perspective view of a seat having the conventional seat switch mounted thereon, and FIG. 19 is a perspective view of the seat switch having the pair of key tops. The pair of key tops 5a and 5b are mounted on and project from an upper surface of the seat switch 3 mounted on a side surface 1a of the power seat (hereinafter referred to as "seat") 1. Each of the key tops 5a and 5b is tiltable in four directions, and for example the key top 5a can operate a forward-backward slide mechanism and a front lifter mechanism while the other key top 5b can operate a reclining mechanism and a rear lifter mechanism.

The seat switch 3 comprises a switch body 7 having the pair of key tops 5a and 5b mounted thereon in a projected manner, and a box-like switch cover 9 of a synthetic resin which covers the switch body 7, and is fixedly secured thereto by screws 11. A pair of holes 13a and 13b are formed through an upper wall of the switch cover 9, and the key tops 5a and 5b extend respectively through these through holes 13a and 13b, and project beyond the upper surface of the switch cover 9 so that the key tops 5a and 5b can be tilted.

Another conventional seat switch, in which three kinds of switches can be selectively operated by a single operating knob, is disclosed, for example, in Japanese Utility Model Unexamined Publication No. Hei. 3-10443. FIG. 20 is a cross-sectional view of the conventional seat switch capable of effecting the selective operation by means of the single knob.

A first moving member 17, a second moving member 19 and a third moving member 21 are mounted on a switch casing 15. The first or central moving member 17 is movable forward and backward (that is, left and right in the drawing), and the right and left moving members are movable upward and downward (that is, upward and downward in the drawing). A switch is mounted at a lower end of the respective moving members 17, 19 and 21, and is operated in accordance with the movement of the corresponding moving member. Each of the moving members is driven only in accordance with the movement of the single operating knob 22 (mounted on the upper portions of the moving members) in a corresponding, specified direction.

In the operation of the seat switch 23 of this construction, when the operating knob 22 is slid forward and backward, the first moving member 17 is moved forward and backward (at this time, the second and third moving members 19 and 21 will not be moved), so that the first switch 27 is switched, thereby moving the seat 1 forward and backward.

When the front portion of the operating knob 22 is pivotally moved upward and downward, the second moving member 19 is moved upward and downward (at this time, the first and third moving members 17 and 21 will not be moved), so that the second switch (not shown) is switched, thereby moving the front portion of the seat upward and downward.

When the rear portion of the operating knob 22 is pivotally moved upward and downward, the third moving member 21 is moved upward and downward (at this time, the first and second moving members 17 and 19 will not be moved), so that the third switch (not shown) is switched, thereby moving the rear portion of the seat 1 upward and downward.

When the whole of the operating knob 22 is moved upward and downward, the second and third moving members 19 and 21 are both moved upward and downward (at this time, the first moving member 17 will not be moved), so that the second and third switches (not shown) are switched at the same time, thereby moving the whole of the seat 1 upward and downward.

In the conventional seat switch 3 shown in FIG. 19, the key tops 5a and 5b project from the upper surface, thus enabling the easy operation of the seat. However, during the operation of the vehicle, the seat switch is required to be operated without resort to the eyes, and besides it is rather difficult to suitably control the operating force, and therefore there has been encountered a problem that the key tops 5a and 5b tend to be tilted by an excessive force, and therefore are subjected to premature damage or breakage. And besides, since the seat switch 3 projects from that side surface of the seat 1 facing a door of the vehicle, the foot of the passenger or driver or a luggage often strikes against the seat switch when the passenger gets on and off the vehicle, so that an impact is applied to the seat switch, which has resulted in a problem that the seat switch is damaged. Furthermore, in the seat switch 3, the through holes 13a and 13b are formed through the upper wall of the switch cover 9, and therefore rain water or drinking water taken by the passenger is liable to intrude into the seat switch through these through holes, so that a malfunction such as short circuiting often occurs.

The conventional seat switch 23 of FIG. 20, though excellent in operability, is also projected from the side surface of the seat, and therefore is liable to be subjected to an impact when getting on and off the vehicle, and hence is liable to be damaged, and may often be operated accidentally. Further, in this seat switch 23, any particular means for preventing the intrusion of rain water or the like is not provided as in the above conventional seat switch, and this leads to the possibility of short circuiting due to the intrusion of the rain water or the like. If a rubber contact member, which is excellent in waterproof and dust prevention properties, is applied to the seat switch 23 of such a construction, the construction becomes complicated, and advantages achieved by the rubber contact member, such as the durability, a reduced number of component parts, and a lightweight and simple construction, are not fully attained.

SUMMARY OF THE INVENTION

The present invention has been made in view of the above problems, and an object of the invention is to provide a seat combination switch which is free from a malfunction due to an impact, the intrusion of rain water or the like, and can be operated in a satisfactory manner and can enhance the reliability and operability.

The above object of the invention has been achieved by a seat combination switch comprising: a thin plate-like switch unit comprising a board having a plurality of contacts, and a sheet-like rubber contact member superposed on the board, the rubber contact member having convex switch portions for opening and closing the plurality of contacts, respectively; a side cover covering the switch unit fixedly mounted on a side surface of a seat portion of a seat; windows formed through the side cover, the switch portions being exposed through the windows; and flanges formed at peripheral edge portions of the windows and projecting outwardly beyond the switch portions.

Preferably, the plurality of switch portions are arranged in corresponding relation to directions of movement of the seat.

The switch portions are surrounded by the flange, and are disposed inwardly of the flange, and therefore when the passenger gets on and off a vehicle, the switch portions will not be subjected to an impact. The switch unit comprises the board and the rubber contact member which are joined together in a generally laminated manner, and therefore the switch unit has enhanced dust prevention and waterproof properties. And besides, the switch unit can be formed into a thin-plate like design, and is combined with the control unit, thereby reducing the number of wiring circuits in the seat. Furthermore, since the switch portions are arranged in corresponding relation to the directions of movement of the seat, the positions of the switches can be recognized easily by touch during the running of the vehicle when the switch portions can not be viewed.

DETAILED DESCRIPTION OF THE PREFERRED EMBODIMENTS

Figure 1:
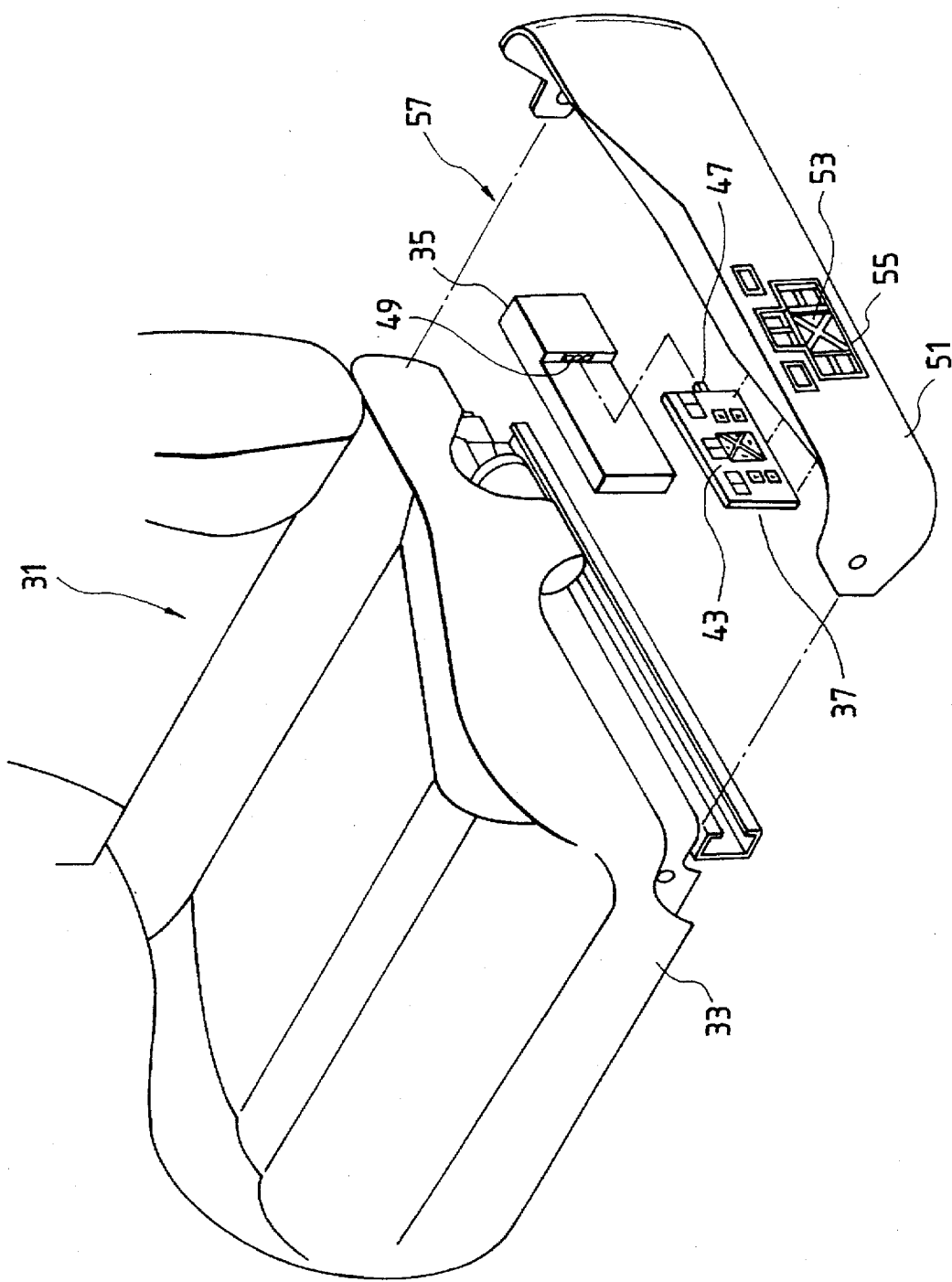
FIG. 1 is an exploded, perspective view of a first embodiment of a seat combination switch of the invention.
Figure 2:
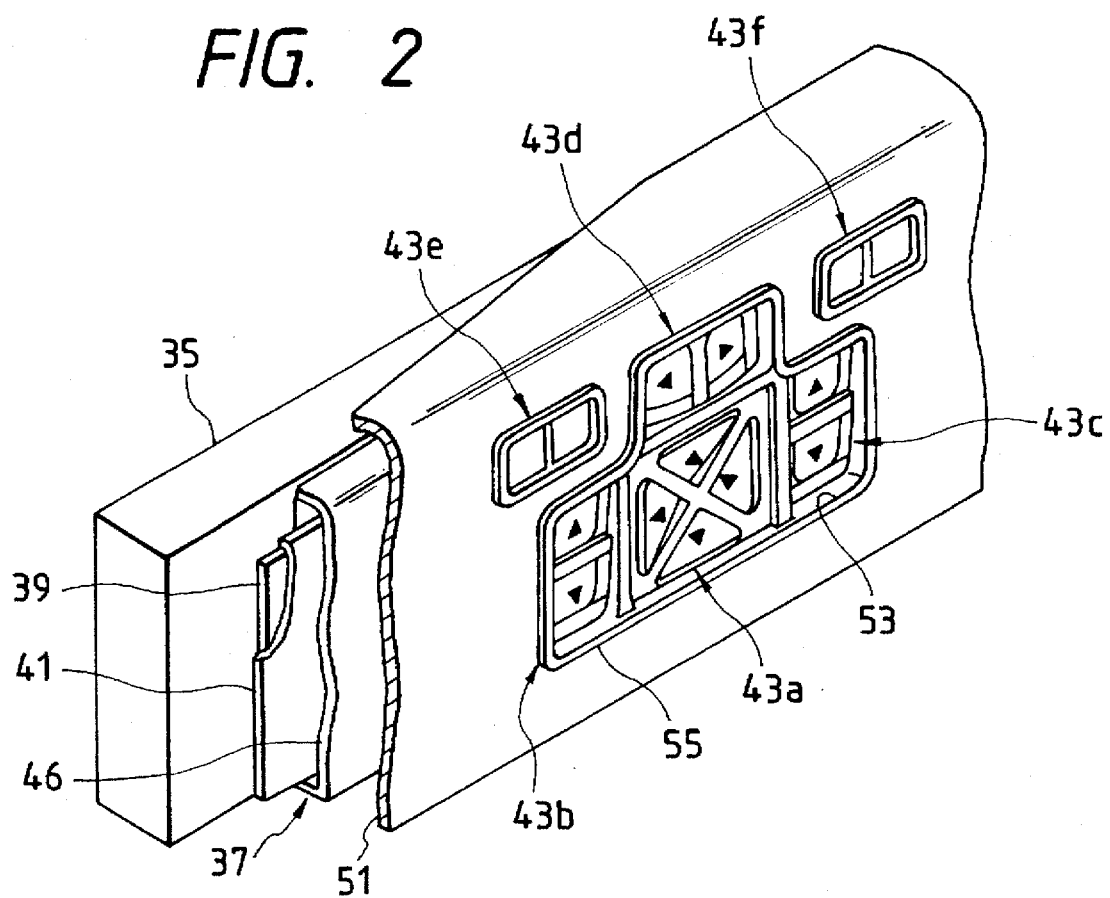
FIG. 2 is an enlarged view of an important portion of the seat combination switch of the first embodiment.
Figure 3:
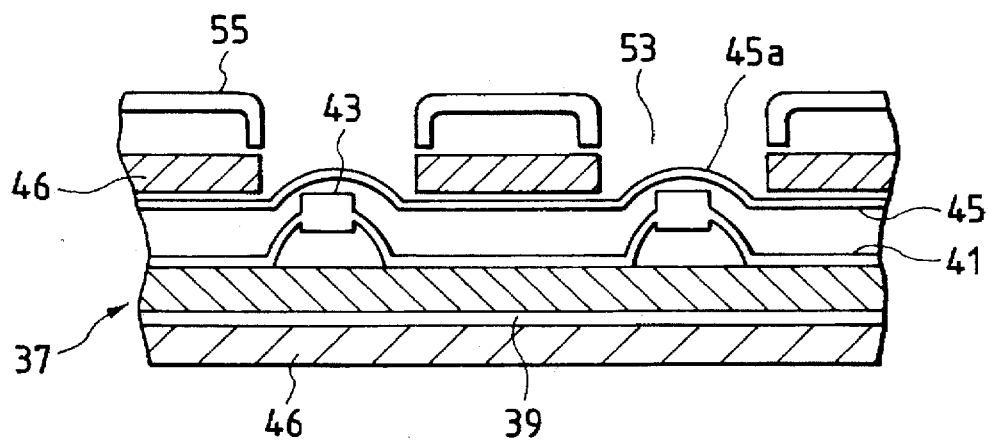
FIG. 3 is a cross-sectional view of the seat combination switch of the first embodiment.

Preferred embodiments of a seat combination switch of the present invention will now be described in detail with reference to the drawings. FIG. 1 is an exploded, perspective view of the seat combination switch of the first embodiment, FIG. 2 is an enlarged view of an important portion of the seat combination switch of the first embodiment, and FIG. 3 is a cross-sectional view of the seat combination switch of the first embodiment.

For example, a control unit 35, serving as a relay device of a multiplex communication control system, is fixedly mounted on a side surface of a seat portion 33 of a seat 31, and this control unit 35 is connected to a floor wire harness (not shown). A switch unit 37 for operating a seat-moving motor is mounted on the control unit 35. As shown in FIG. 3, the switch unit 37 comprises a printed circuit board 39, and a plurality of carbon print contacts or gold-plated contacts for feeding seat operation signals are formed on the printed circuit board 39.

A rubber contact member 41 is superposed on the board 39, and the rubber contact member 41 has a plurality of inverted cup-shaped switch portions 43. A contact is formed on the inner side of the switch portion 43, and when the switch portion 43 is depressed, its contact is brought into contact with the associated carbon print contact on the board 39, thereby closing the switch. A resin (e.g. PET) sheet 45 is formed over the surface of the rubber contact member 41, and the resin sheet 45 has convex portions 45a disposed correspondinly with the switch portions 43, respectively. The board 39, the rubber contact member 41 and the resin sheet 45 are contained in a stacked or laminated manner in a cover casing 46, thereby constituting the thin plate-like switch unit 37.

The respective switch portions 43 of the rubber contact member 41 are arranged in corresponding relation to directions of movement of the seat 31. More specifically, as shown in FIG. 2, there is provided a first switch group 43a comprising four switch portions 43 of a triangular shape arranged in a generally cross-shaped pattern, with their apexes directed toward the center. The upper and lower switch portions 43 of the first switch group 43a are used for moving the seat 31 upward and downward, and the front and rear switch portions 43 of the first switch group 43a are used for moving the seat 31 forward and backward.

A second switch group 43b and a third switch group 43c (each of which consists of a pair of upper and lower switch portions 43) are provided on the front and rear sides of the first switch group 43a, respectively. The upper and lower switch portions of the front-side switch group 43b are used for moving the front portion of the seat 31 upward and downward, and the upper and lower switch portions of the rear-side switch group 43c are used for moving the rear portion of the seat 31 upward and downward. A fourth switch group 43d, consisting of a pair of front and rear switch portions 43, is provided above the first switch group 43a, and this fourth switch group is used for reclining purposes. Further, a fifth switch group 43e and a sixth switch group 43f (each of which consists of a pair of front and rear switch portions 43) are provided on the front and rear sides of the fourth switch group 43d, respectively, and for example the switch group 43f constitutes a lumbar switch. Therefore, for moving the seat 31 in a desired direction, the switch portion provided in the corresponding direction is operated.

The switch unit 37 comprises the board 39, the rubber contact member 41 and the resin sheet 45 joined together in a generally laminated manner, and therefore has a very thin, waterproof construction. A connector 47 (see FIG. 1), connected to the respective contacts, is mounted on the board 39 of the switch unit 37, and this connector 47 is fittingly connected to a mating connector 49 mounted on the control unit 35. Therefore, the switch unit 37 is connected to the control unit 35 through the connectors 47 and 49.

A side cover (finish panel) 51 is attached to the side surface of the seat 31 to which the control unit 35 and the switch unit 37, connected together as described above, is fixedly secured. The side cover 51 has windows 53 disposed correspondingly to the switch portions 43 of the switch unit 37, and the switch portions 43 are received in these windows 53. A flange 55 is formed at a peripheral edge portion of the window 53, and projects outwardly from the outer surface of the side cover 51, so that the switch portions 43 are disposed inwardly of the flange 55, as shown in FIG. 3. Therefore, when an object strikes against the outer surface of the side cover 51, the flanges 55 prevent an impact from being applied to the switch portions 43.

In the seat combination switch 57 of the above construction, the switch portions are surrounded by the flange 55, and are disposed inwardly of the flange 55, and therefore when the passenger gets on and off a vehicle, an impact will not be applied to the switch portions 43, and a malfunction of the switch portions 43 due to such an impact is prevented.

The switch unit 37 comprises the rubber contact member 41 and the resin sheet 45 joined together in a laminated manner into the thin plate-like construction, and therefore the dust prevention and waterproof properties can be enhanced greatly. Because of the thin plate-like construction, the switch unit 37 can be connected to the control unit 35 in a generally unitary manner, and therefore the number of wiring circuits in the seat can be reduced, and a wire harness can be simplified.

The switch unit 37 and the control unit 35 are connected together through the connectors 47 and 49, and therefore they can be easily mounted and removed, and the assembling efficiency as well as the maintenance efficiency can be enhanced.

The switch portions 43 are arranged in associated relation to the directions of movement of the seat 31, and therefore even when the switch portions can not be viewed during the running of the vehicle, the enhanced operability of the switch is achieved.

Figure 4:
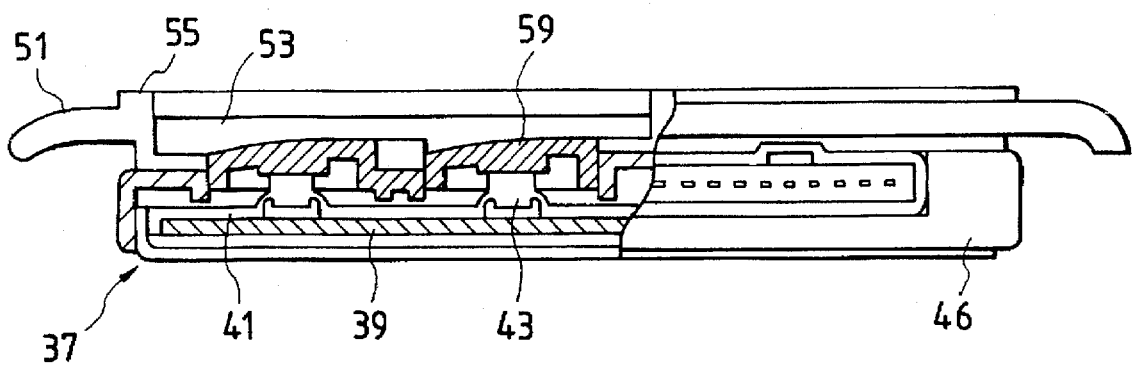
FIG. 4 is cross-sectional view showing a modified form of a switch unit of the first embodiment.

In the above embodiment, although the switch portions 43 of the switch unit 37 are covered by the resin sheet 45, the switch portions 43 of the switch unit 37 may be covered by button-like key tops 59, respectively, as shown in FIG. 4.

Figure 5:
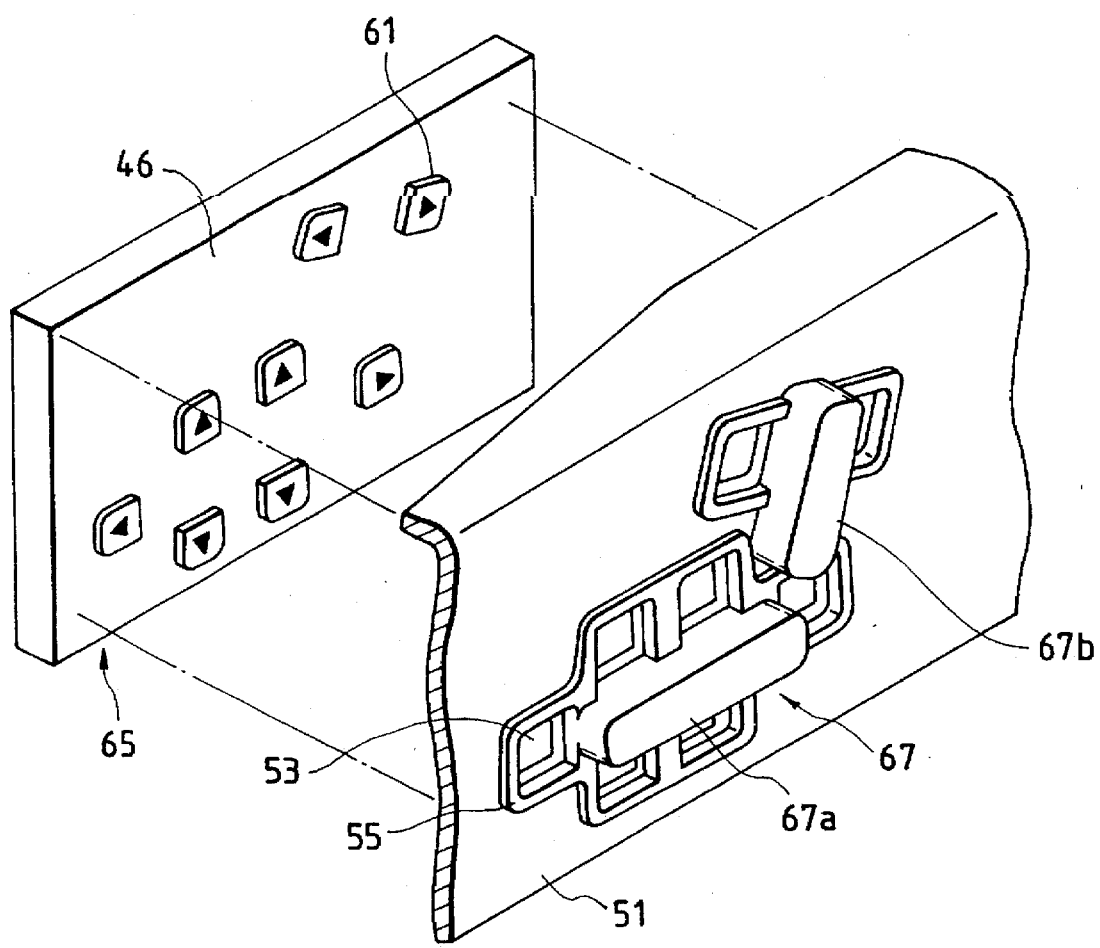
FIG. 5 is an exploded, perspective view of a second embodiment of a seat combination switch.
Figure 6:
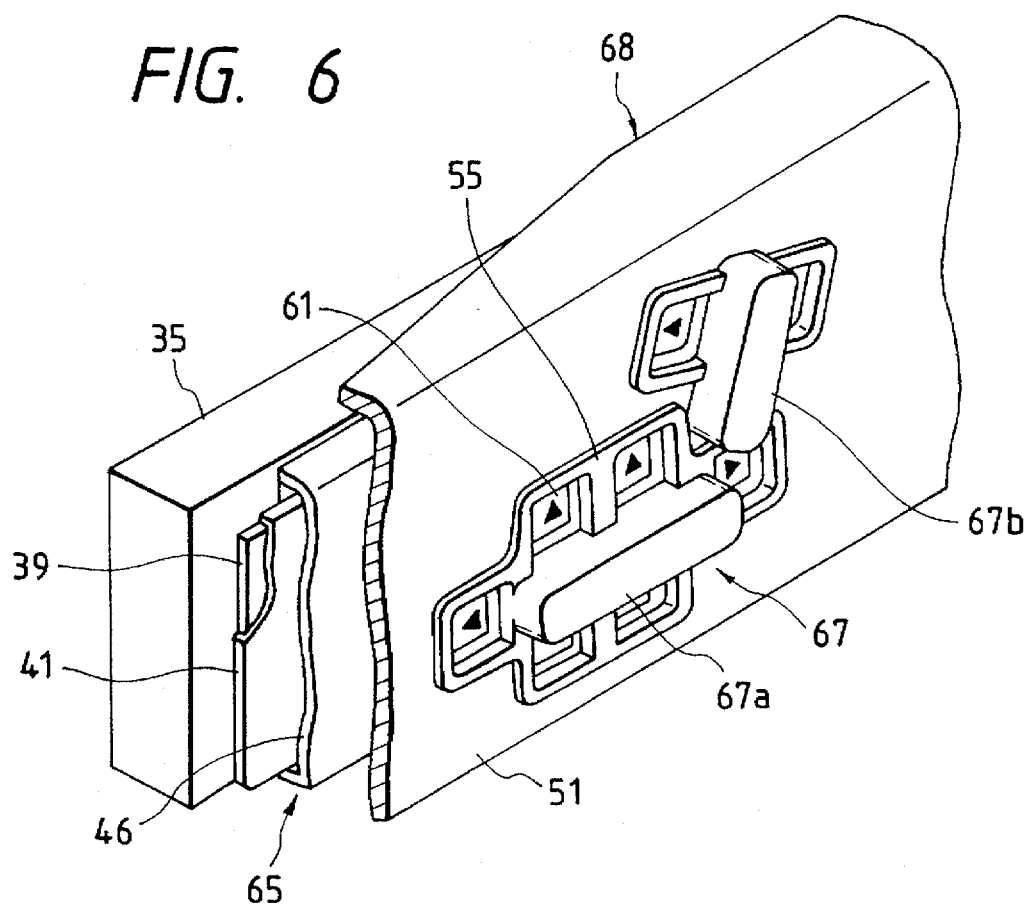
FIG. 6 is a partly-broken view of the seat combination switch of the second embodiment in its assembled condition.
Figure 7:
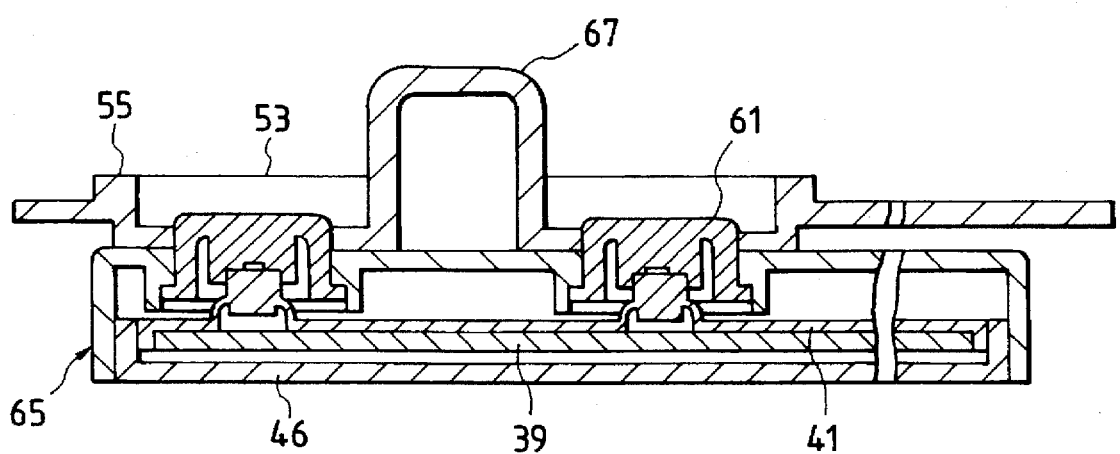
FIG. 7 is a cross-sectional view of the seat combination switch of the second embodiment.
Figure 8:
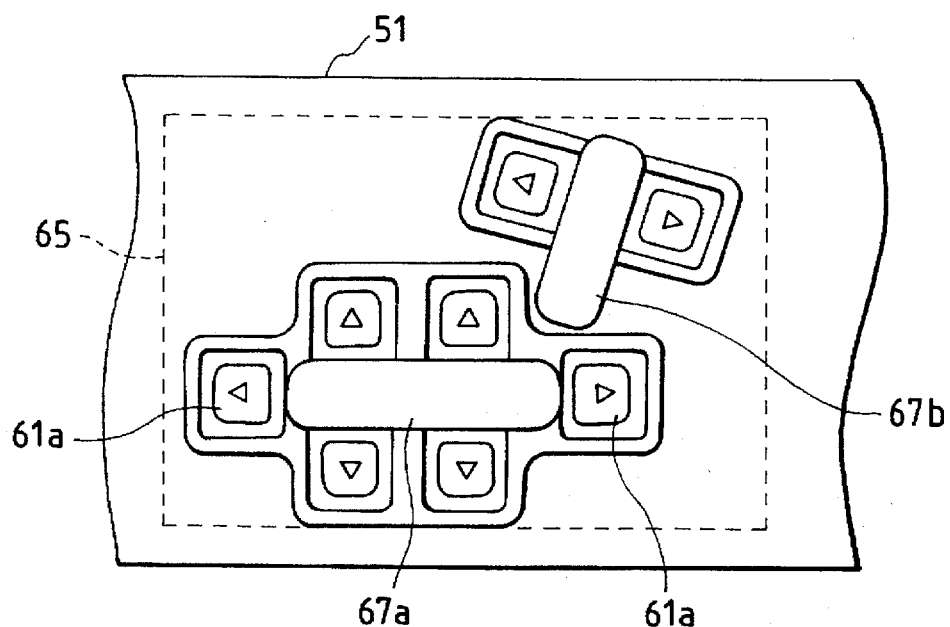
FIG. 8 is a front-elevational view, showing switch portions.

A second embodiment of a seat combination switch of the invention will now be described. FIG. 5 is an exploded, perspective view of the seat combination switch of the second embodiment, FIG. 6 is a partly-broken view of the seat combination switch of the second embodiment in its assembled condition, FIG. 7 is a cross-sectional view of the seat combination switch of the second embodiment, and FIG. 8 is a front-elevational view, showing switch portions.

In this embodiment, a connector 47 (see FIG. 1) for direct connection to a control unit 35 is mounted on a rear surface of a board 39 as in the preceding embodiment. The board 39 is covered by a rubber contact member 41, thereby achieving waterproof and dust prevention properties. As shown in FIG. 7, thin key tops 61 are mounted on the rubber contact member 41. The board 39, the rubber contact member 41 and the key tops 61 are contained in a thin plate-like cover casing 46, thereby constituting a switch unit 65. In this embodiment, the key tops 61 may be replaced by the resin sheet 45 used in the preceding embodiment.

As shown in FIG. 5, a protuberance 67, having a shape resembling a seat, is formed on a side cover 51 covering the switch unit 65. More specifically, this protuberance 67 has a first protuberance 67a resembling a seat portion, and a second protuberance 67b resembling a seat back. The key tops 61 are arranged around the protuberance 67 in corresponding relation to directions of movement of the seat 31. More specifically, the key tops 61a, used for moving the seat 31 forward and backward, are provided on front and rear sides of the first protuberance 67a, respectively, as shown in FIG. 8.

As in the preceding embodiment, the respective key tops 61 are disposed inwardly of a flange 55 formed at a peripheral edge portion of a window 53 formed through the side cover 51.

The seat combination switch 68 of this embodiment achieves similar effects as achieved in the preceding embodiment, and more specifically achieves the reduction of malfunction of the switch portions, a simplified construction of a wire harness and enhanced assembling and maintenance efficiencies, and besides because of the provision of the seat-resembling protuberance 67 enabling easy recognition by touch, the operability of the switch can be further enhanced during the running of a vehicle when the switch can not be viewed easily.

Figure 9:
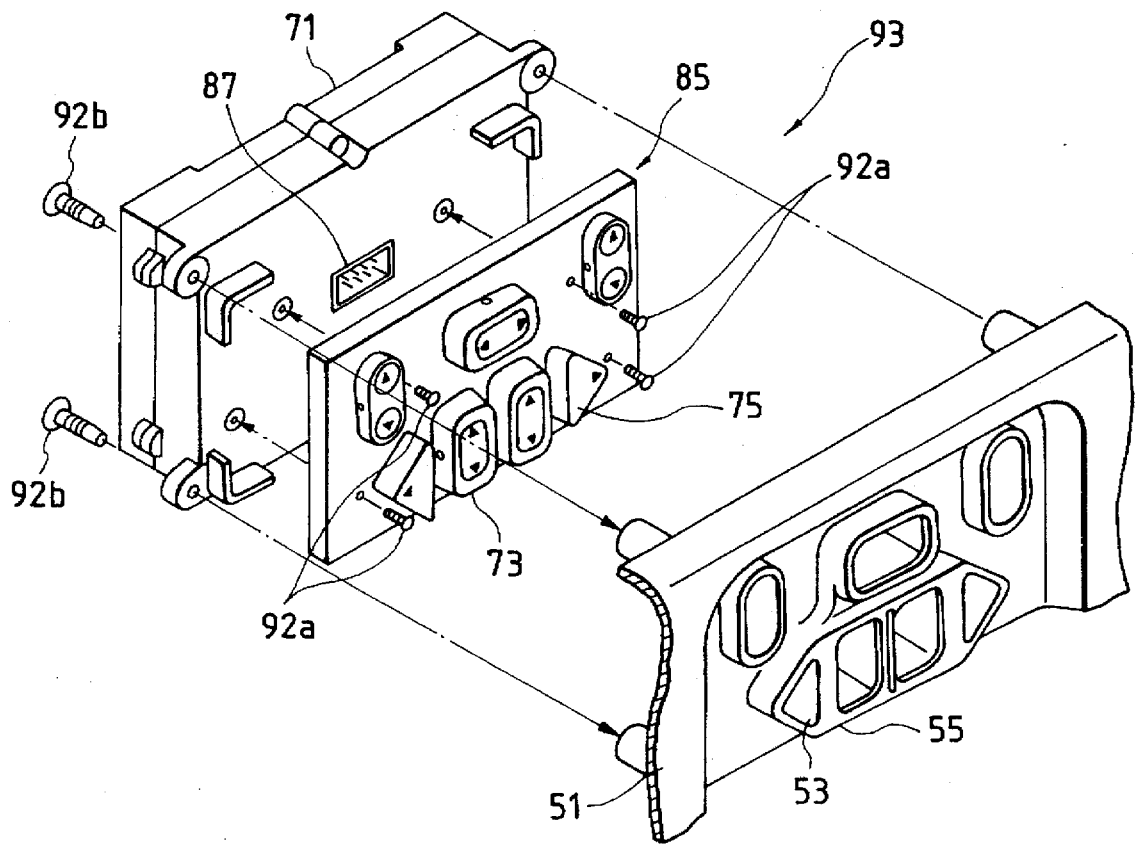
FIG. 9 is an exploded, perspective view of a third embodiment of a seat combination switch.
Figure 10:
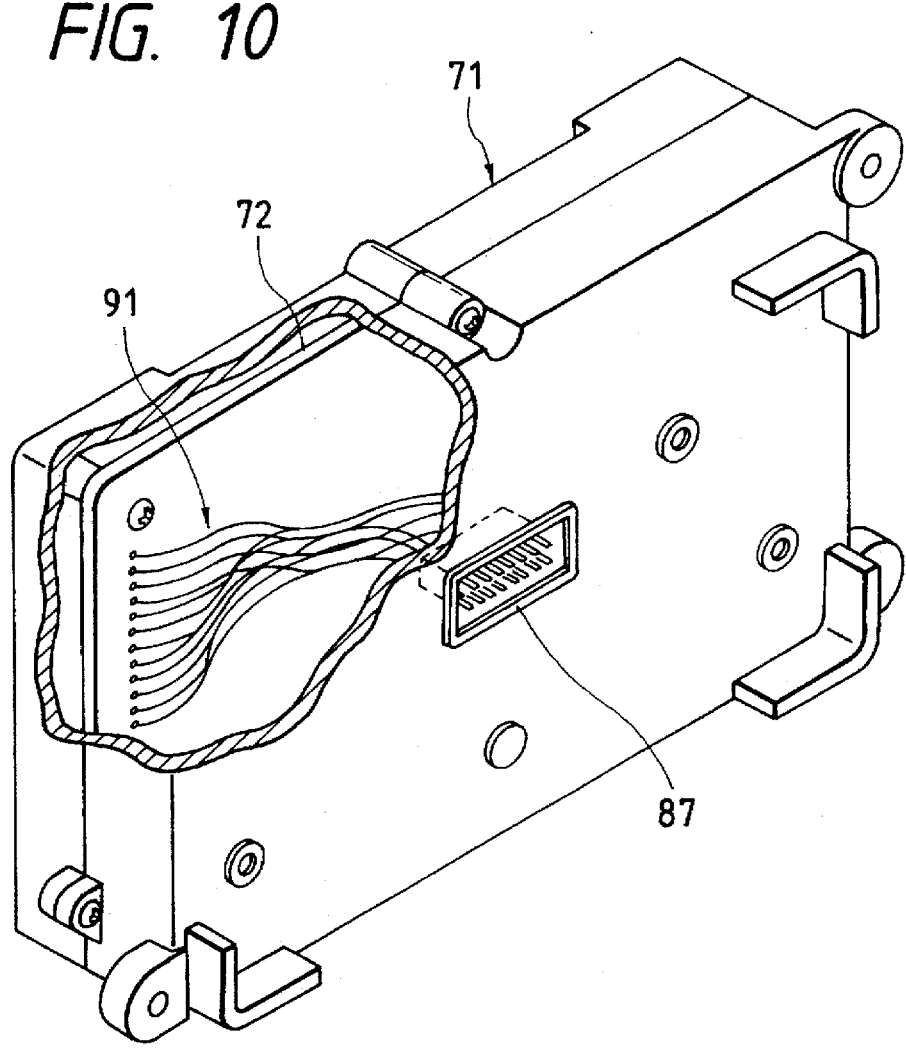
FIG. 10 is a partly-broken, perspective view of a control unit used in the third embodiment.
Figure 11:
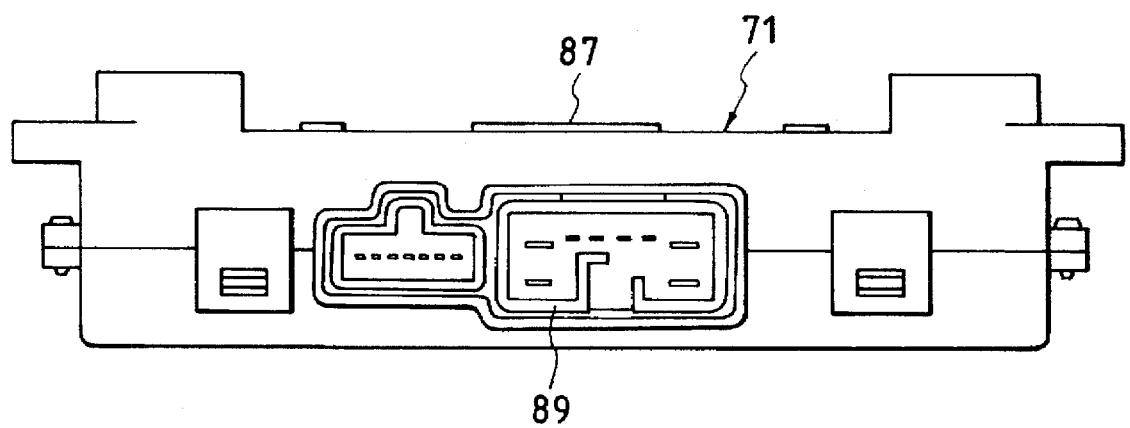
FIG. 11 is a bottom view of the control unit.
Figure 12A:
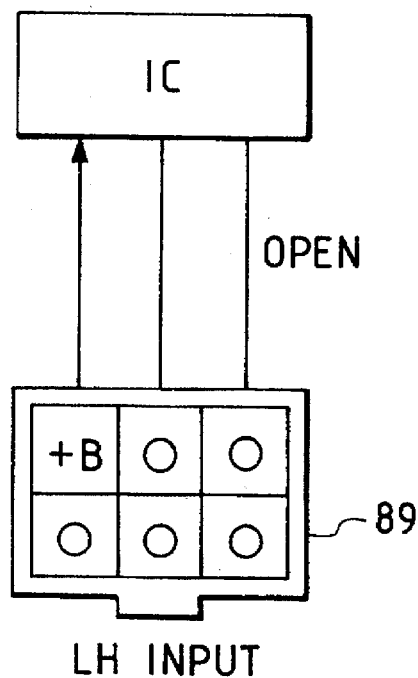
FIGS. 12(a) and 12(b) are explanatory views showing the arrangement of electrodes of a control unit connector.
Figure 12B:
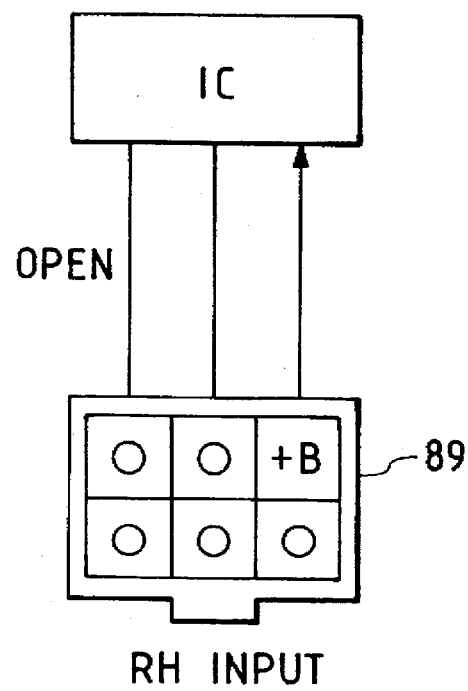
Figure 14:
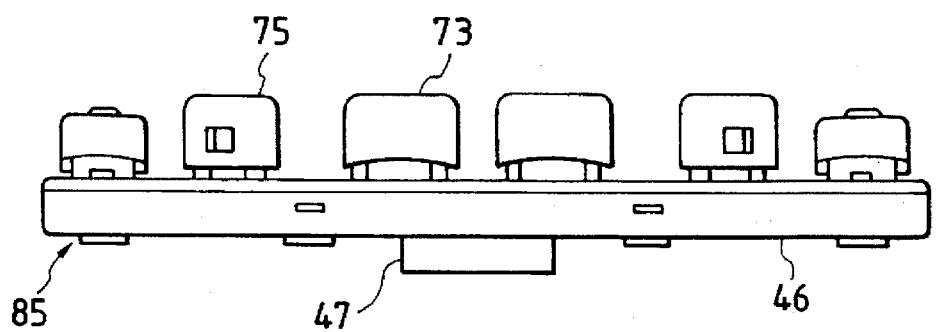
FIG. 14 is a side-elevational view of the switch unit.
Figure 15:
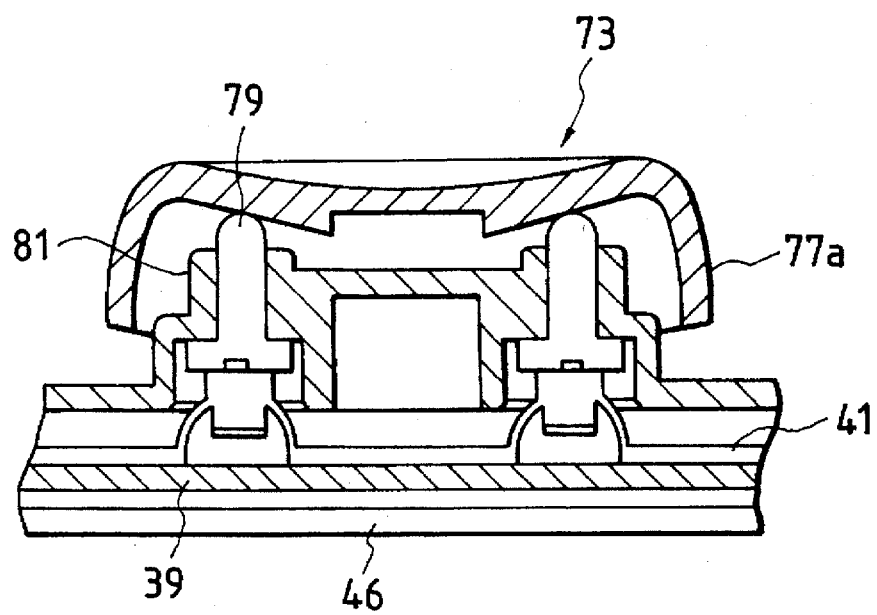
FIG. 15 is a cross-sectional view of a see-saw unit.
Figure 16:
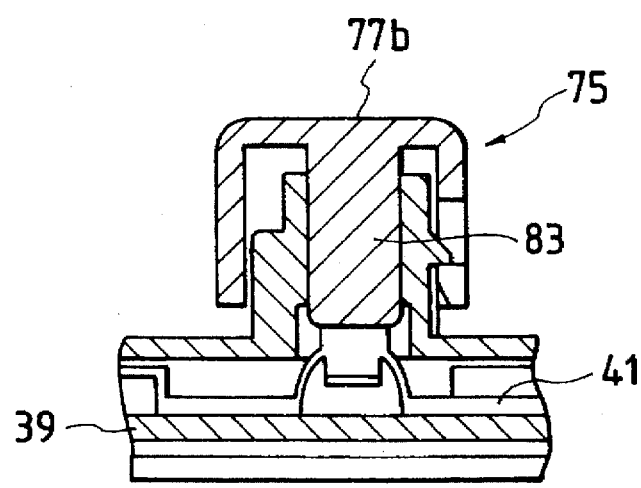
FIG. 16 is a cross-sectional view of a push switch.
Figure 17:
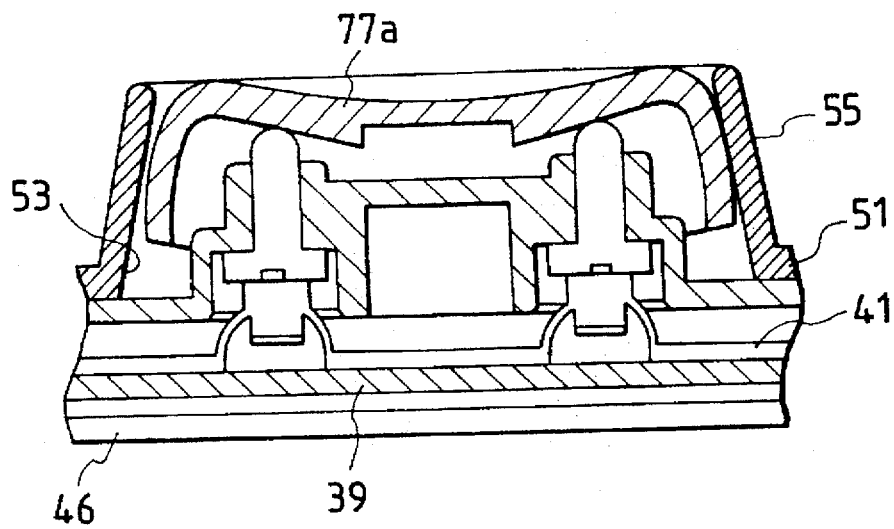
FIG. 17 is cross-sectional view of the see-saw switch incorporated in a side cover.
Figure 18:
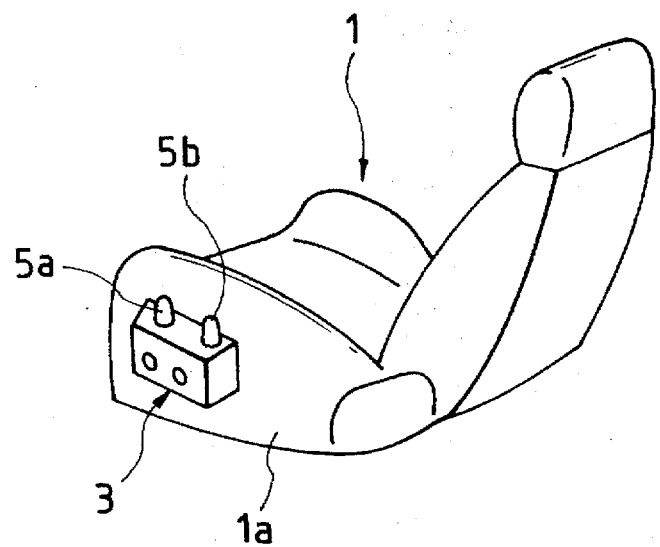
FIG. 18 is a perspective view of a seat incorporating a conventional seat switch.
Figure 19:
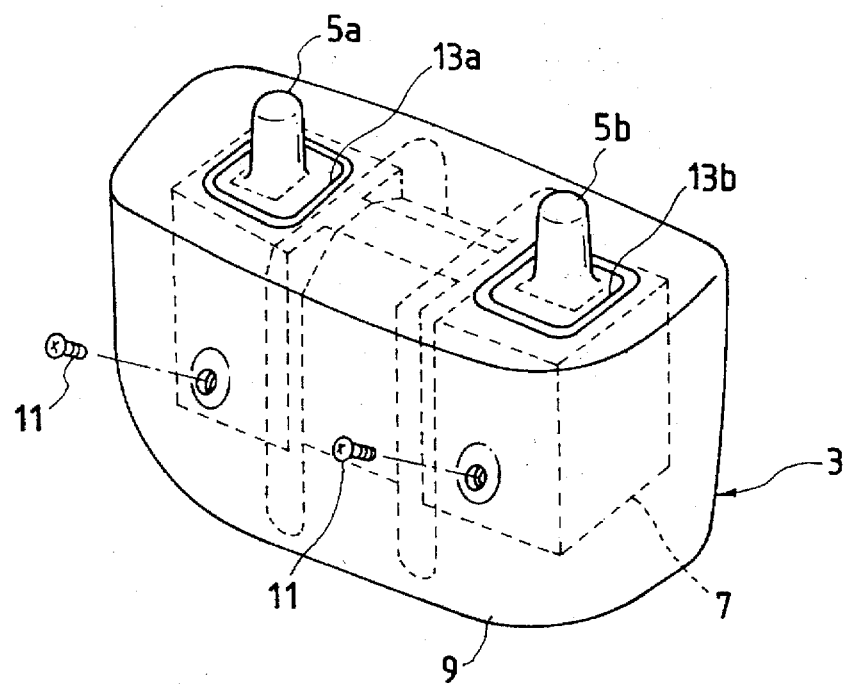
FIG. 19 is a perspective view of the seat switch having a pair of key tops.
Figure 20:
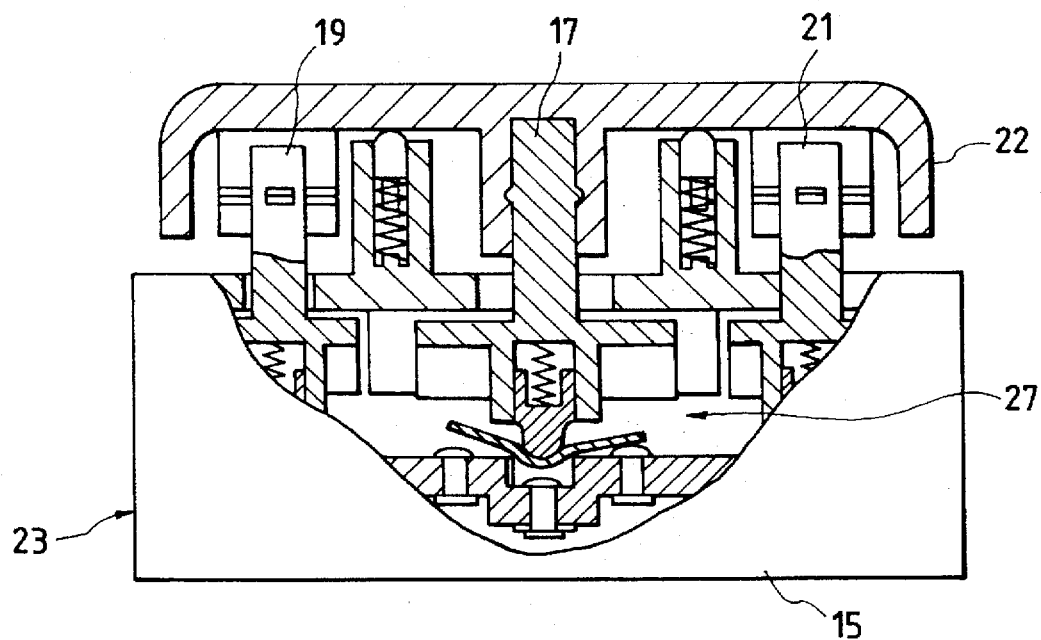
FIG. 20 is a cross-sectional view of a conventional seat switch capable of effecting a selective operation by means of a single knob.

A third embodiment of a seat combination switch of the invention will now be described. FIG. 9 is an exploded, perspective view of the seat combination switch of the third embodiment, FIG. 10 is a partly-broken, perspective view of a control unit used in the third embodiment, FIG. 11 is a bottom view of the control unit, FIGS. 12(a) and 12(b) are explanaroty views showing the arrangement of electrodes of a control unit connector, FIG. 13 is an explanatory view showing common use of a switch unit, FIG. 14 is a side-elevational view of the switch unit, FIG. 15 is a cross-sectional view of a see-saw unit, FIG. 16 is a cross-sectional view of a push switch, and FIG. 17 is cross-sectional view of the see-saw switch incorporated in a side cover.

In this embodiment, a connector 47 (see FIG. 14) for direct connection to a control unit 71 is mounted on a rear surface of a board 39 as in the first embodiment. The board 39 is covered with a rubber contact member 41, thereby achieving waterproof and dust prevention properties.

The switch portions of this embodiment comprise the see-saw switches 73 and the push switches 75. As shown in FIG. 15, the see-saw switch 73 comprises push pins 79 and a push pin guide 81 which are provided in a key top 77a. As shown in FIG. 16, the push switch 75 comprises a push pin 83 formed in a key top 77b integrally therewith. The use of these switches enables a thin design of the switch unit 85.

Figure 13:
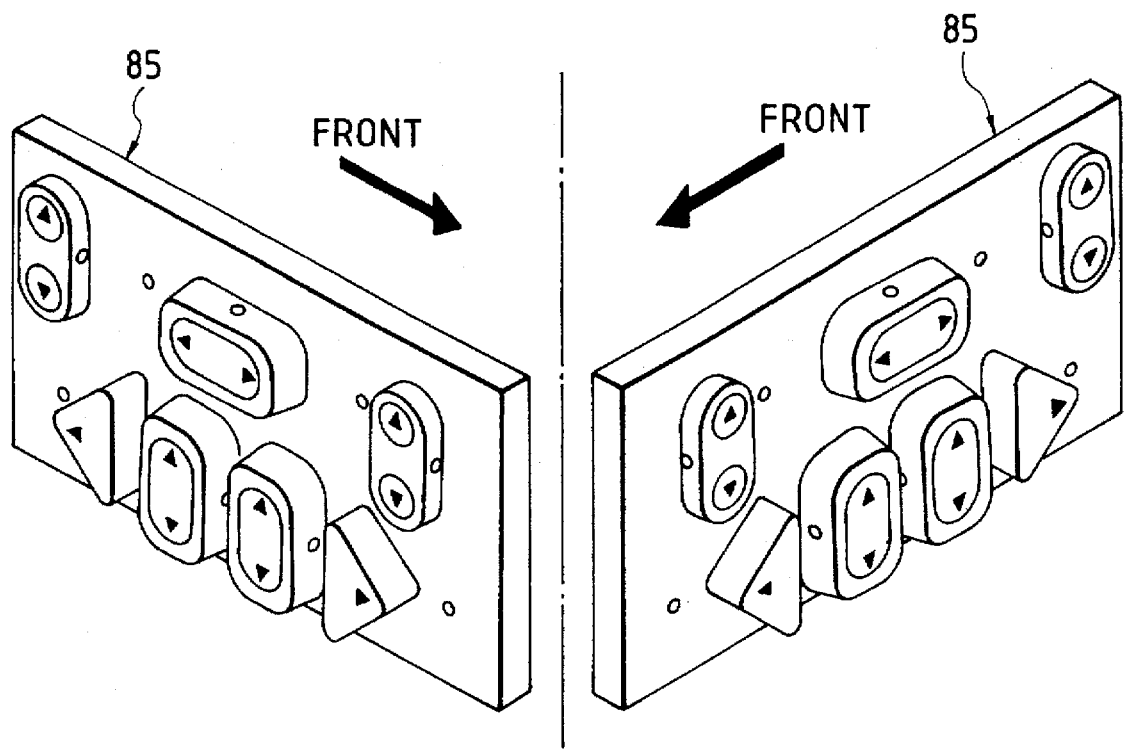
FIG. 13 is an explanatory view showing common use of a switch unit.

As in the above embodiments, the switch portions are arranged in corresponding relation to the directions of movement of the seat 31, and as shown in FIG. 13, the switch portions are arranged symmetrically with respect to a plane midway between the front and rear ends (right and left ends in FIG. 13) of the switch unit 85. Therefore, the switch unit 85 of this embodiment can be used for either of the right and left seats 31. Also, the control unit 71 is symmetrical with respect to a plane midway between the front and rear ends thereof, and a connector 87 for connection to the switch unit 85 is mounted at a central portion of the control unit 71.

A connector 89 (see FIG. 11) for connection to a floor wire harness (not shown) is mounted at a central portion of a lower surface of the control unit 71 so that any inconvenience will not occur even if the control unit 71 is attached to either of the right and left seats 31. As shown in FIG. 10, the connector 87 mounted on the control unit 71 has a non-directional, symmetrical shape, and is connected to a board 72 by wires 91. By suitably changing the connection arrangement of the wires 91, or by providing internal software with a switching function, the same control unit 71 can be commonly used for the right and left seats. With respect to the switching function of the internal software, for example, a power source position (designated by +B in FIGS. 12(a) and 12(b)) of the input connector 89 is detected, and in accordance with this position, the connection is switched from right to left or vice versa.

For assembling this structure, the switch unit 85 is fixedly secured to the control unit 71 by screws 92a, and then the control unit 71 thus connected to the switch unit 85 is fixedly secured to the side cover 51 by screws 92b, as shown in FIG. 9.

In this embodiment, as shown in FIG. 17, the key tops 77a, 77b are disposed flush with or inwardly of a flange 55 formed at a peripheral edge portion of a window 53 formed through the side cover 51, as in the above embodiments.

The seat combination switch 93 of this embodiment achieves similar effects as achieved in the first embodiment, and more specifically achieves the reduction of malfunction of the switch portions, a simplified construction of a wire harness and enhanced assembling and maintenance efficiencies, and besides because of the symmetrical configuration of the switch unit 85, the switch unit 85 can be commonly used for either of the right and left seats, and therefore the number of the component parts can be reduced.

As described above, in the seat combination switches of the invention, the switch portions are surrounded by the flange, and are disposed inwardly of the flange, and therefore when the passenger gets on and off a vehicle, the switch portions will not be subjected to an impact, and malfunction of the switch portions due to such an impact is reduced.

The switch unit comprises the board and the rubber contact member which are combined together in a generally laminated manner, and therefore the switch unit has enhanced dust prevention and waterproof properties, thus enhancing the reliability. And besides, the switch unit has a thin-plate like design, so that it can be combined with the control unit, thereby reducing the number of wiring circuits in the seat and simplifying the wire harness.

Furthermore, since the switch portions are arranged in corresponding relation to the directions of movement of the seat, the operability of the switches can be enhanced even during the running of the vehicle when the switch portions can not be viewed.

What is claimed is:

1. A seat combination switch comprising:

a thin plate-like switch unit comprising a board having a plurality of contacts, and a sheet-like rubber contact member superposed on said board, said rubber contact member having convex switch portions for opening and closing said plurality of contacts, respectively;

a side cover covering said switch unit fixedly mounted on a side surface of a seat portion of a seat;

windows formed through said side cover, said switch portions being exposed through said windows; and flanges formed at peripheral edge portions of said windows and projecting outwardly beyond said switch portions.

2. A seat combination switch according to claim 1, furthering comprising a resin sheet covering an outer surface of said rubber contact member, said resin sheet having convex portions disposed correspondingly to said switch portions.

3. A seat combination switch according to claim 1, wherein said plurality of switch portions are arranged in corresponding relation to directions of movement of the seat.

4. A seat combination switch according to claim 1, further comprising a connector mounted on said board, said connector being directly connected to a control unit fixedly mounted on the side surface of the seat portion.

5. A seat combination switch according to claim 1, further comprising a protuberance with a shape resembling the seat, said protuberance being provided on said side cover, and said switch portions being arranged around said protuberance in corresponding relation to directions of movement of the seat.

6. A seat combination switch according to claim 2, wherein said switch portions are arranged symmetrically with respect to a plane midway between front and rear ends of said switch unit.

* * * * *